United States Patent [19]

Nagy

[11] 4,341,281
[45] Jul. 27, 1982

[54] SPLIT AXLE DRIVE MECHANISM

[75] Inventor: Laszlo Nagy, St. Clair Shores, Mich.

[73] Assignee: General Motors Corporation, Detroit, Mich.

[21] Appl. No.: 126,561

[22] Filed: Mar. 3, 1980

[51] Int. Cl.³ .............................................. B60K 23/08
[52] U.S. Cl. ....................................... 180/247; 74/710
[58] Field of Search ................ 180/247, 248, 76, 24.1; 74/711, 713, 710

[56] References Cited

U.S. PATENT DOCUMENTS

| | | | |
|---|---|---|---|
| 1,139,853 | 5/1915 | Dyer | 180/76 |
| 1,201,232 | 10/1916 | Archer . | |
| 1,440,341 | 12/1922 | Crispen . | |
| 2,770,150 | 11/1956 | Culverwell | 180/246 |
| 2,913,929 | 11/1959 | Anderson | 180/246 |
| 3,058,558 | 10/1962 | Hawk | 180/246 |
| 3,123,169 | 3/1964 | Young | 180/246 |

Primary Examiner—Randolph A. Reese
Assistant Examiner—Ross Weaver
Attorney, Agent, or Firm—F. J. Fodale

[57] ABSTRACT

A split axle drive mechanism for a part-time four-wheel drive vehicle comprises an automotive type differential which has an input to the differential case and a pair of outputs from the respective side gears. One output is directly connected to its associated side gear so that the associated side gear is always drive connected to one selectively driven vehicle wheel. The other output includes a clutch which is disengaged in the two wheel drive mode (selected at the transfer case) so that the other selectively driven vehicle wheel does not back drive the other side gear. This reduces wear and power consumption in the two wheel drive mode.

5 Claims, 5 Drawing Figures

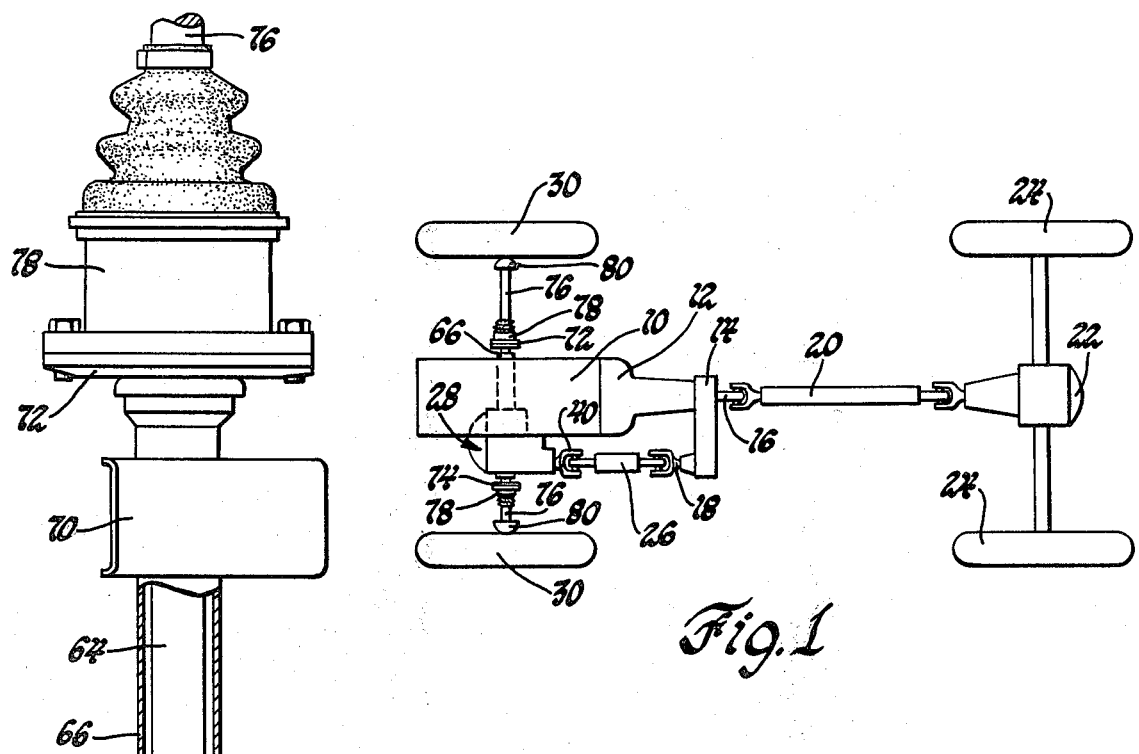
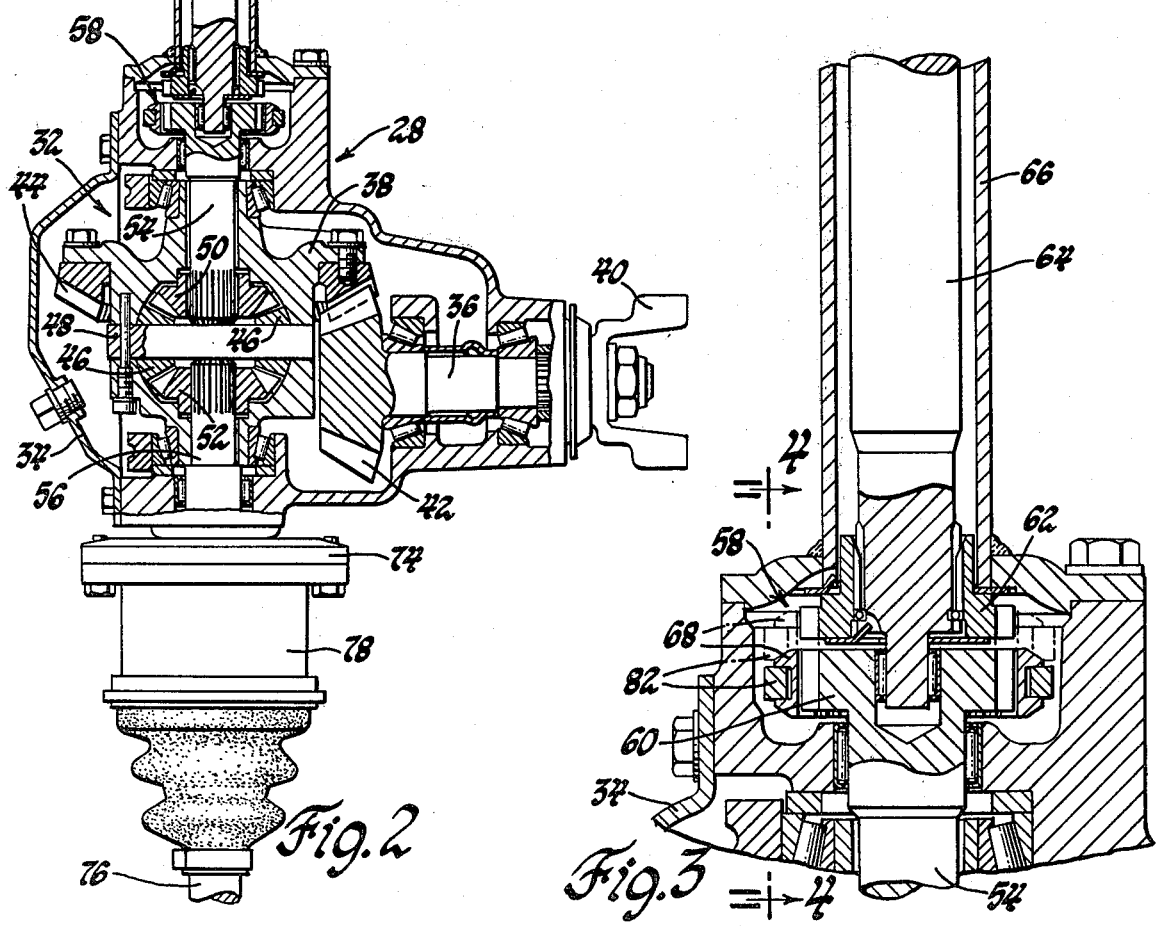

SPLIT AXLE DRIVE MECHANISM

This invention relates generally to split axle drive mechanisms and more particularly to split axle drive mechanisms for part-time four-wheel drive vehicles.

A common drive configuration for a part-time four-wheel drive vehicle comprises a transfer case having an input shaft driven by the vehicle transmission and two output shafts. One output shaft is drive connected to the input shaft for continuously driving one set of vehicle wheels, usually the rear wheels, through a propeller shaft, differential and split axle. The second output shaft is connectable to the input shaft by a clutch or the like in the transfer case for selectively driving the other set of vehicle wheels, usually the front wheels, through a second propeller shaft, differential and split axle. Two wheel drive is provided when the clutch in the transfer case is disengaged and four-wheel drive when the clutch is engaged.

A long standing problem associated with part-time four-wheel drive configurations of the above-noted type is wear and power consumption in the two wheel drive mode. This is caused by the non-driven front wheels back driving the drive line components between the non-driven wheels and the clutch or comparable mechanism in the transfer case which disconnects the second output shaft from the transfer case input shaft.

One well known solution is the use of hub locks at each non-driven front wheel to disconnect the wheel from its associated split axle part when two wheel drive is selected at the transfer case. This solution eliminates back drive of the split axle parts, differential and propeller shaft for the non-driven front wheels as well as the transfer case components ahead of the clutch or disconnect in the transfer case. Hub locks, however, are either inconvenient to operate (manual hub locks) or expensive and complicated (automatic hub locks).

Another solution is proposed in U.S. Pat. No. 2,913,929 granted to Martin E. Andersen on Nov. 24, 1959. The Andersen solution is a front axle assembly having a differential, two clutch units and a rack and pinion device for disconnecting the split axle parts from their associated side gears in the differential. This solution is slightly less efficient than the use of wheel hubs inasmuch as the split axle parts are still back driven by the non-driven wheels when two wheel drive is selected at the transfer case and the clutch units are disengaged by the rack and pinion mechanism.

The object of this invention is to improve upon the solution proposed by Andersen. Basically, I have discovered that only one of the split axle parts need be disconnected from its associated side gear in the differential. My solution has significant advantages in cost and weight savings, simplicity of construction, and compactness in design since one clutch and a complex device for synchronizing the operation of two clutches is eliminated.

Other objects and features of the invention will become apparent to those skilled in the art as the disclosure is made in the following detailed description of a preferred embodiment of the invention as illustrated in the accompanying sheets of drawing in which:

FIG. 1 is a schematic plan view of a part-time four-wheel drive vehicle incorporating a split axle drive mechanism in accordance with my invention.

FIG. 2 is a partially sectioned plan view of the split axle drive mechanism shown in FIG. 1.

FIG. 3 is an enlargement of a portion of FIG. 2.

Figure 4:
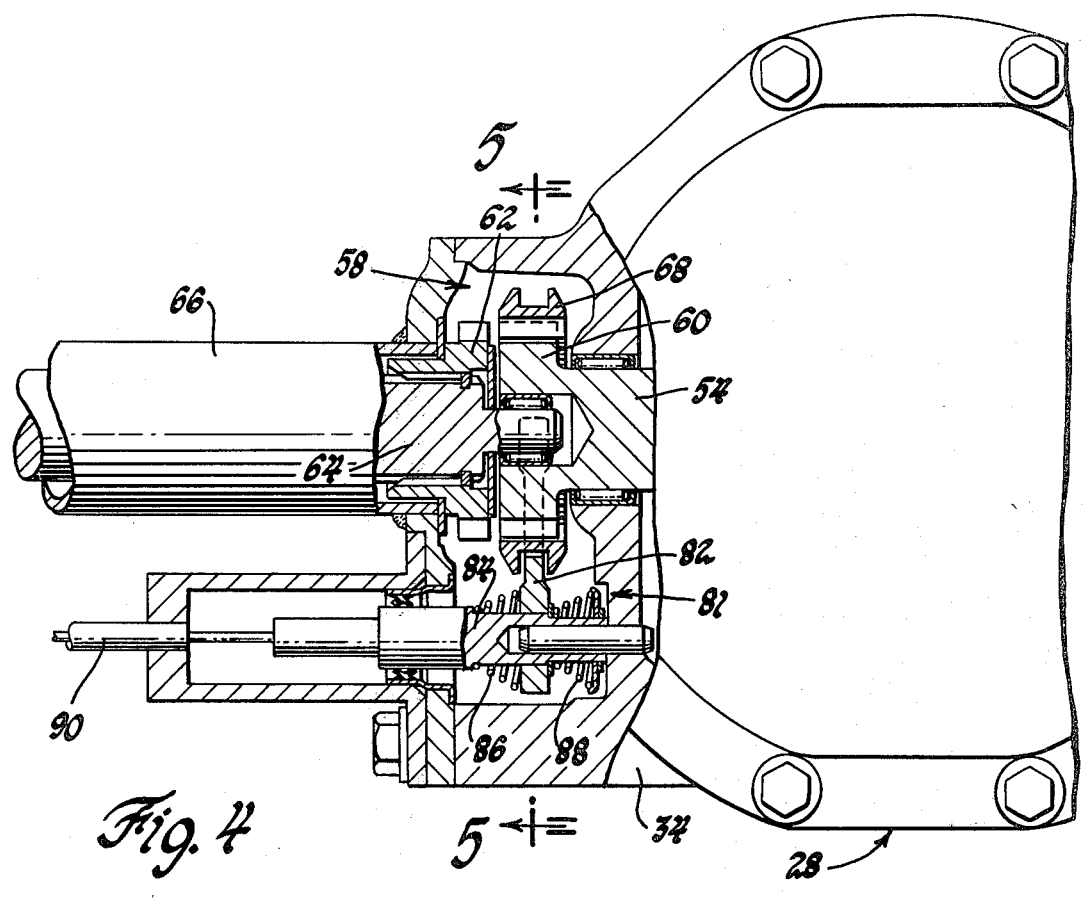
FIG. 4 is a section taken substantially along the line 4—4 of FIG. 3 looking in the direction of the arrows.

Referring now to the drawing and particularly FIG. 1, there is shown a schematic plan view of a part-time four-wheel drive vehicle, comprising engine 10, transmission 12 and transfer case 14 mounted on a vehicle chassis (not shown). The engine 10 and transmission 12 are well known components as is the transfer case 14 which typically has an input shaft (not shown), a main output shaft 16 and an auxiliary output shaft 18. The main output shaft 16 is drive connected to the input shaft in the transfer case 14 and is customarily aligned with it. The auxiliary output shaft 18 is drive connectable to the input shaft by a clutch or the like in the transfer case 14 and customarily offset from it. The clutch is actuated by a suitable selector mechanism (not shown) which is generally remotely controlled by the vehicle driver.

The main output shaft 16 is drivingly connected to a rear propeller shaft 20 which in turn is drivingly connected to a rear differential 22. The rear differential 22 drives the rear wheels 24 through split axle parts in a well known manner.

The auxiliary output shaft 18 is drivingly connected to a front propeller shaft 26 which in turn is drivingly connected to a split axle drive mechanism 28 for selectively driving the front wheels 30 through split axle parts.

My invention relates to the split axle drive mechanism 28 which will now be explained in conjunction with FIGS. 2 through 5. As shown in FIG. 2, the split axle drive mechanism 28 includes an automotive type differential 32 inside a housing 34. The differential 32 has a drive shaft 36 and a differential case 38 rotatably mounted in the housing 34 on orthogonally related axes. The drive shaft 36 is the differential input and has an external yoke 40 at one end for universally coupling the drive shaft 36 to the front propeller shaft 26. The internal end of the drive shaft 36 has an integral driving pinion 42 which meshes with a ring gear 44 attached to the differential case 38. The differential case 38 carries a plurality of rotatable pinion gears 46 mounted on a cross pin 48. The pinion gears 46 mesh with side gears 50 and 52 which are splined to the ends of the stub shafts 54 and 56 respectively. The stub shafts 54 and 56 are rotatably mounted in the housing 34 on the differential case axis. These stub shafts are rotatable relative to each other and to the differential case. The differential 32 as thus far described and its mode of operation are well known.

Figure 5:
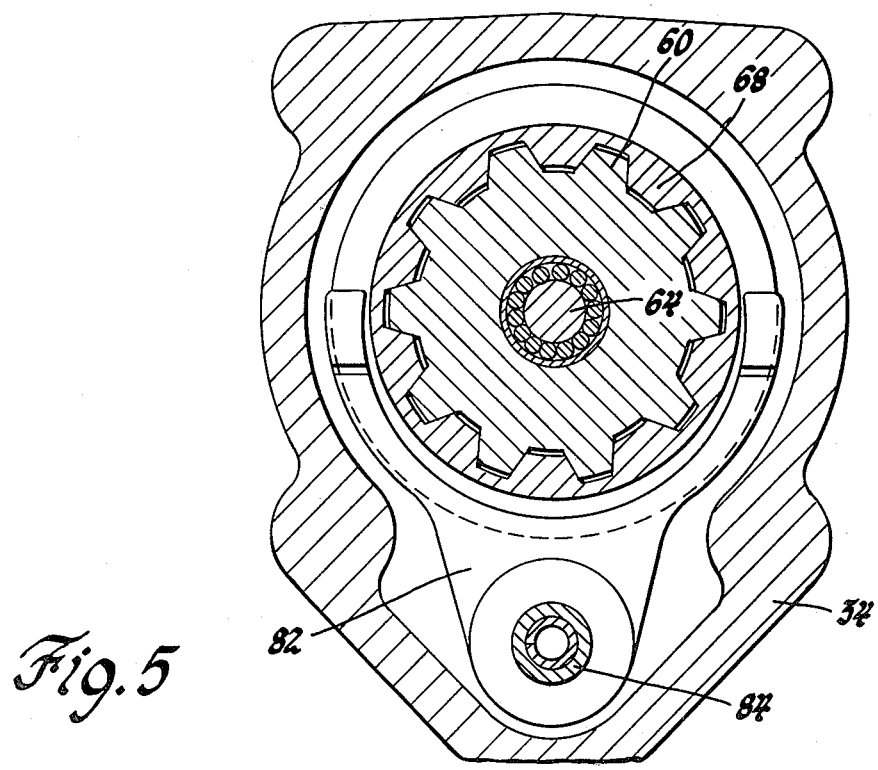
FIG. 5 is a section taken substantially along the line 5—5 of FIG. 4 looking in the direction of the arrows.

The split drive axle mechanism 28 further includes a positive clutch 58 which is best shown in FIGS. 3, 4 and 5. The clutch 58 changes the mode of operation of the differential 32 and makes it particularly useful for the selectively driven wheels in a part-time four-wheel drive vehicle. As disclosed in the drawings, the clutch 58 comprises an integral spline wheel 60 at the outer end of the stub shaft 54 and a matching spline wheel 62 attached to the inner end of an extension shaft 64. The extension shaft 64 has its inner end journalled in the hollow outer end of the stub shaft 54 and its outer end journalled in a bearing (not shown) at the remote end of an extension tube 66 attached to the housing 34.

The clutch 58 further includes an internally splined sleeve 68 which is slidably mounted on the spline wheel 60. The splined sleeve 68 is shiftable between a disengaged position (shown in solid lines in FIG. 3) and an engaged position (shown in phantom lines in FIG. 3) where it couples the spline wheels 60 and 62. (The shifter for operating the clutch 58 will be described in detail later on).

The split axle drive mechanism 42 is attached to the vehicle chassis by means of a housing bracket (not shown) and a bracket 70 on the extension tube 66.

The split axle drive mechanism 28 has two outputs for the respective split axle parts associated with the respective front wheels 30. One output is the stub shaft 54, clutch 58 and extension shaft 64 which has an external flange 72 for attaching one of the split axle parts. The other output is the stub shaft 56 which has an external flange 74 for attaching the other split axle part.

Suitable split axle parts, commonly referred to as half shafts, are well known from front wheel drive automobiles. These may be used for connecting the split axle drive mechanism 28 to the front wheels 30. The drawings schematically illustrate a common type of half shaft for a driving connection to independently suspended steerable vehicle wheels comprising an axle shaft 76 having a plunging universal joint 78 at its inboard end adapted for connection to an output such as the flange 72 or 74 and the well known Rzeppa type universal joint 80 at its outboard end adapted to be connected to the vehicle wheel 30.

The split axle drive mechanism 28 also includes a shifter 81 for operating the clutch 58. The shifter comprises a fork 82 having its tines engaged in an external groove of the sleeve 68 and its base slidably mounted on a slide 84. The fork 82 is positioned on the slide 84 by opposed coil springs 86 and 88. The slide 84 itself is translated by a push-pull cable 90. FIG. 4 shows the fork 82 and the slide 84 in the clutch disengaged position. The clutch 46 is engaged by moving the slide 84 to the left from the position shown in FIG. 4. This loads the spring 88 which in turn biases the fork 82 and sleeve 68 toward the left. The sleeve 68 then slides into engagement with the spline wheel 62 under the action of spring 88 when their respective splines align in a complementary manner. The clutch 46 is disengaged by returning the slide to the position shown in FIG. 4. This loads the spring 86 which in turn returns the slide 84 and fork 82 to the clutch disengaged position when the biasing force of spring 86 is sufficient to overcome the torque load on the engaged splines of spline wheel 62 and sleeve 68.

The split axle drive mechanism 28 operates as a conventional differential when the clutch 58 is engaged and the vehicle is in the four-wheel drive mode. In this mode the auxiliary output shaft 18 is drive connected to the input shaft in the transfer case 14 and it drives the drive shaft 36 (differential input). The drive shaft 36 in turn drives the differential case 38 which drives the two differential outputs (stub shaft 54 with the clutched extension shaft 64 and stub shaft 56) by means of pinion gears 46 and side gears 50 and 52. The two differential outputs rotate in unison or at different speeds when necessary in a well known manner.

For the two wheel drive mode, the drive to the auxiliary output shaft 18 is disconnected in the transfer case and the clutch 58 is disengaged by the shifter 81. In this condition, the lower wheel 30 shown in FIG. 1 back drives the side gear 52 but the upper wheel 30 does not back drive the side gear 50 because the clutch 58 is disengaged. Since the torque load is removed from the side gear 50, the side gear 52 merely counter-rotates the side gear 50 through the pinion gears 46. Hence, there is no back drive to the differential case 38, drive shaft 36 (differential input), front propeller shaft 26, auxiliary output shaft 18 and other transfer case components connected to the auxiliary output shaft 18 ahead of the disconnect in the transfer case 14. This mode of operation eliminates the major portion of wear and power consumption which would result from back drive of both wheels 30.

The split axle drive mechanism 28 does back drive more components than the solution proposed by Andersen which is described earlier. The pinion gears 46 and side gears 50 and 52 rotate whereas the Andersen pinion gears and side gears do not. But since these gears are not loaded and have a small mass, there is little if any wear or power consumption caused by the back drive. Any small loss in efficiency is far outweighed by the reduced complexity and weight of the mechanism in comparison to the Andersen front axle assembly.

In order to return to the four-wheel drive mode, the auxiliary output shaft 18 is first drive connected to the input shaft in the transfer case 14. This drives the drive shaft 36 (differential input) and the differential case 38. The driven differential case reverses the rotation of the counter-rotating side gear 50 and tends to synchronize the speeds of the side gear 50 and stub shaft 64. Once the speeds are synchronous or nearly so, the clutch 58 is engaged at any vehicle speed by the shifter 81 and both front wheels 30 are driven with the split axle drive mechanism 28 once again acting as a conventional differential.

When changing from four-wheel drive to two wheel drive it is also preferable to disconnect the auxiliary output shaft 18 in the transfer case 14 before disengaging the clutch 58 so that the torque load on the clutch 58 is reduced.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A split axle drive mechanism for a part-time four-wheel drive vehicle having a transfer case which includes an auxiliary output shaft connectable to an input shaft of the transfer case for selectively driving a pair of vehicle wheels through a split axle comprising, in combination, a differential having a drive shaft for receiving drive from the auxiliary output shaft of the transfer case and two outputs connected to respective side gears of the differential and adapted to be connected to respective parts of the split axle, one of said outputs being directly connected to one side gear of the differential and the other of the outputs being connected to the other side gear of the differential through a clutch which is disengageable for preventing back drive to the other side gear when the vehicle is in a two wheel drive mode.

2. A split axle drive mechanism for a part-time four-wheel drive vehicle having a transfer case having an auxiliary output shaft connectable to an input shaft of the transfer case for selectively driving a pair of vehicle wheels through a split axle comprising, in combination, a differential having a drive shaft for receiving drive from the auxiliary output shaft of the transfer case and two outputs connected to respective side gears of the differential and adapted to be connected to respective parts of the split axle, one of said outputs being directly connected to one side gear of the differential and permitting back drive to the one side gear when the vehicle is in a two wheel drive mode, and the other of the outputs being connected to the other side gear of the differential through a clutch which is disengageable for preventing back drive to the other side gear when the vehicle is in a two wheel drive mode.

3. A split axle drive mechanism for a part-time four-wheel drive vehicle having a transfer case which includes an auxiliary output shaft connectable to an input shaft of the transfer case for selectively driving a pair of vehicle wheels through a split axle comprising, in combination, a differential having a drive shaft for receiving drive from the auxiliary output shaft of the transfer case and two outputs connected to respective side gears of the differential and adapted to be connected to respective parts of the split axle, one of said outputs comprising a shaft having an inner end drive connected to one side gear of the differential and an outer end adapted for non-declutchable attachment to one split axle part for driving one of the pair of vehicle wheels, and the other of the outputs comprising a shaft drive connected to the other side gear of the differential and an extension shaft connected to the shaft by a clutch, said extension shaft having an outer end adapted for non-declutchable attachment to the other split axle part for driving the other of the pair of vehicle wheels, said clutch being disengageable for preventing back drive to the other side gear when the vehicle is in a two-wheel drive mode.

4. A split axle drive mechanism for a part-time four-wheel drive vehicle having a transfer case which includes an auxiliary output shaft connectable to an input shaft of the transfer case for selectively driving a pair of vehicle wheels through a split axle comprising, in combination, a differential having a drive shaft for receiving drive from the auxiliary output shaft of the transfer case and two outputs connected to respective coaxial side gears of the differential and adapted to be connected to respective parts of the split axle, one of said outputs comprising a coaxial shaft having an inner end drive connected to one side gear of the differential and an outer end adapted for non-declutchable attachment to one split axle part for driving one of the pair of vehicle wheels, and the other of the outputs comprising a coaxial shaft drive connected to the other side gear of the differential and a coaxial extension shaft connected to the shaft by a positive clutch, said extension shaft having an outer end adapted for non-declutchable attachment to the other split axle part for driving the other of the pair of vehicle wheels, and said clutch being disengageable for preventing back drive to the other side gear when the vehicle is in a two-wheel drive mode.

5. In a two-wheel, four-wheel drive vehicle having a pair of selectively driven wheels, a differential for driving the pair of selectively driven wheels and a transfer case for selectively driving the differential, the improvement comprising in combination, means for non-declutchably attaching a side gear of the differential to a first selectively driven wheel and means including a clutch for attaching a second side gear of the differential to a second selectively driven wheel, said clutch being disengageable in the two-wheel drive mode to prevent back drive from the second selectively driven wheel to the second side gear in the two-wheel drive mode.

* * * * *